May 22, 1962  H. R. CLOOTS  3,035,379
METHOD OF PACKAGING COMPRESSIBLE ARTICLES
Filed June 13, 1960  2 Sheets-Sheet 1
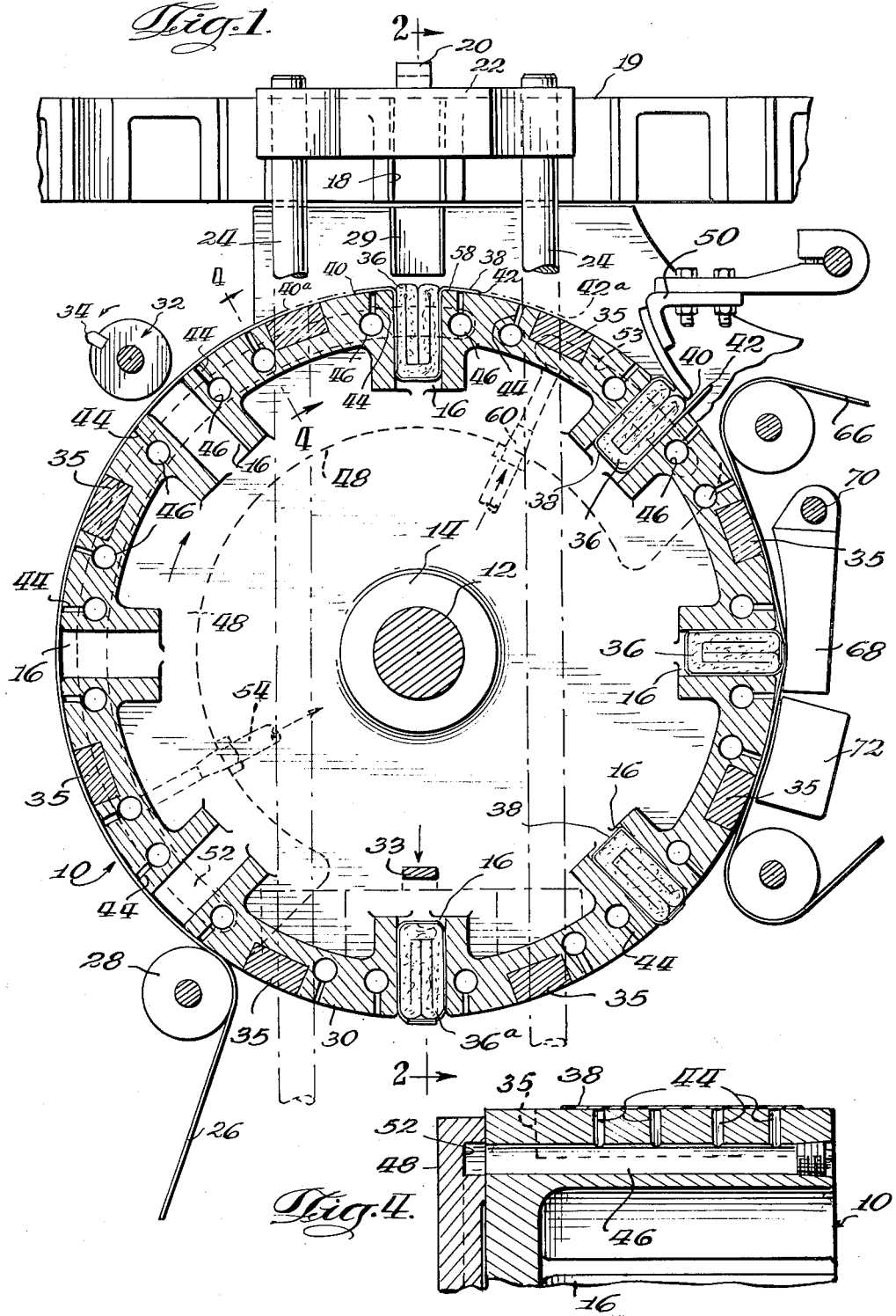

May 22, 1962 — H. R. CLOOTS — 3,035,379
METHOD OF PACKAGING COMPRESSIBLE ARTICLES
Filed June 13, 1960 — 2 Sheets-Sheet 2
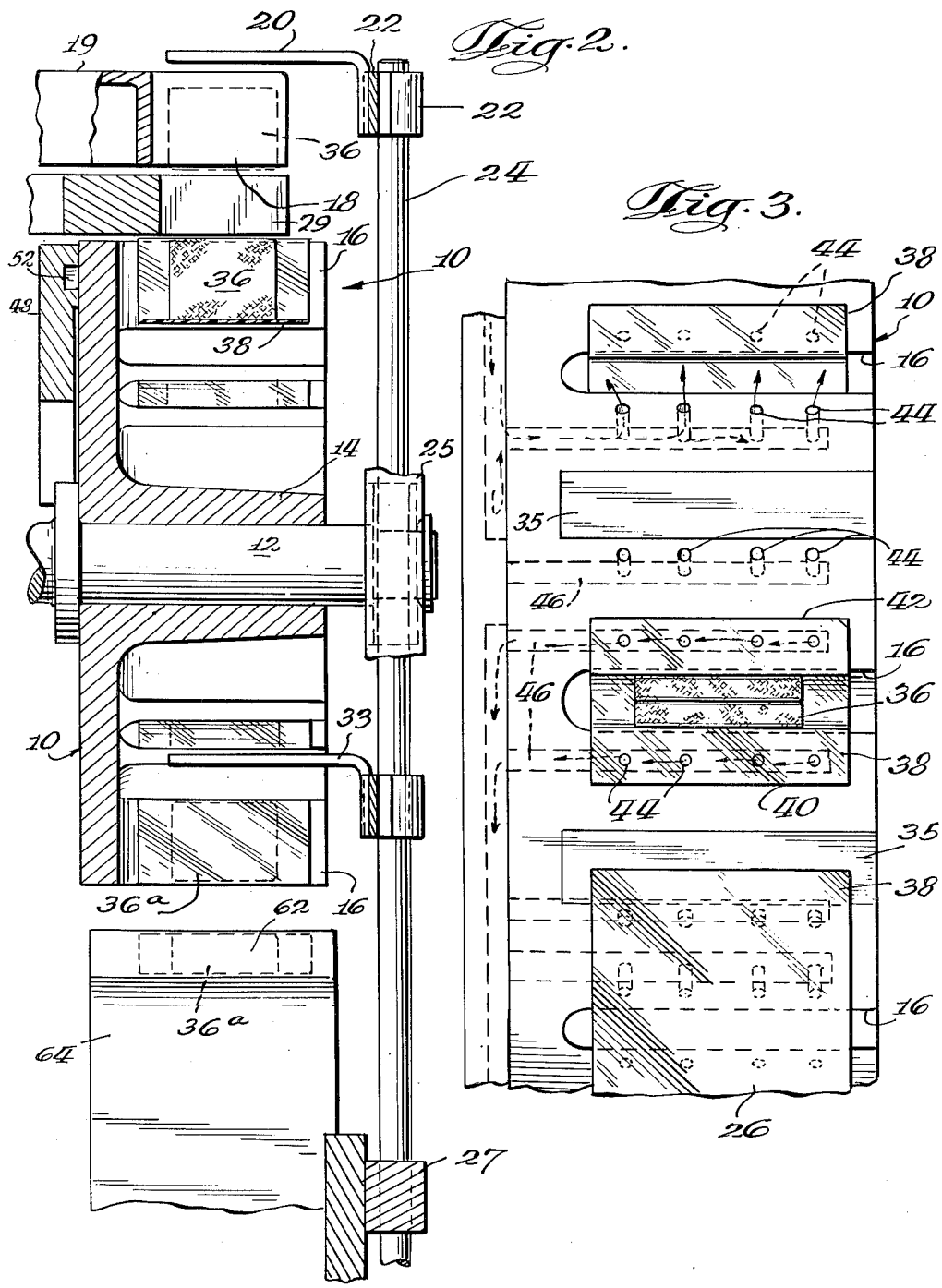

United States Patent Office 3,035,379
Patented May 22, 1962

---

3,035,379
METHOD OF PACKAGING COMPRESSIBLE ARTICLES
Henry R. Cloots, Neenah, Wis., assignor to Kimberly-Clark Corporation, Neenah, Wis., a corporation of Delaware
Filed June 13, 1960, Ser. No. 35,718
2 Claims. (Cl. 53—34)

This invention relates to article packaging and more particularly to an improved method and apparatus for handling sheet material as it is processed by a packaging turret.

A primary object of the invention is to provide an improved means for properly maintaining thin sheet material such as a plastic film against the peripheral surface of packaging turret during feeding, cutting and packaging operations to effect desired positioning and tensioning of the material, both while it is cut into panels when so held and during a subsequent wrapping operation.

Another object is to provide an improved means of holding sheet stock during an initial cutting operation and providing controlled feeding thereof as the cut panels are snugly wrapped about articles as they are fed into turret pockets.

Other objects and advantages will become apparent to persons skilled in the art, as will various modifications thereof without departure from the inventive principles as defined in the appended claims.

In the drawings:

FIGURE 1 is a front elevational view, partially in section, illustrating the invention incorporated in a packaging turret, FIGURE 2 is taken along lines 2—2 of FIG. 1 and illustrates, largely in vertical section, the turret of FIG. 1, FIGURE 3 shows fragmentarily in plan the turret of FIGS. 1 and 2, FIGURE 4 is a fragmentary detail taken along lines 4—4 of FIG. 1.

It is known to apply sheet-like wrapping material such as a thin sheet of polyethylene to the surface of a packaging turret, and while so applied to cause the material to be cut in panels positioned over article receiving pockets preparatory to a loading operation. It is also known to employ certain types of vacuum hold-down devices to retain panels of sheet material in place prior to the loading operation. However, the vacuum hold-down devices heretofore proposed have inherent shortcomings since they fail to remain operative in the manner herein taught to retain a cut panel under proper tension until completion of the loading operation to thus insure snug and unwrinkled encirclement of the article by the sheet material.

FIG. 1 shows a packaging turret 10 mounted on shaft 12, journalled at 14 to be driven in a step-by-step movement in a clockwise direction, as viewed, for the successive alignment of article receiving chambers 16 in registry with a chamber 18. An article to be packaged is transferred from chamber 18 of a loading turret 19 downwardly into aligned chamber 16 by a finger 20 fixed to a bracket 22 carried by a pair of reciprocally driven rods 24 suitably journalled at 25 and 27. Wrapping material 26, such as a thin plastic film, is drawn from a supply roll, not shown, through a nip formed by an applicator roll 28 and the peripheral surface 30 of turret 10. As the turret rotates clockwise in steps, material 26, held in snug engagement with the turret surface by vacuum means incorporating the invention moves under a rotary cutter 32, driven counter-clockwise as shown, to cause a knife 34 to cut material 26 into panels, cutter 32 being synchronized in respect to the turret speed to effect that cut against a hardened insert 35.

FIGURE 1 illustrates turret 10 in a position of rest with an article, in this instance a folded sanitary napkin 36, after transfer from loading turret 19 into chamber 16 of turret 10 in registry therewith at the loading station. A panel 38 of sheet-like wrapping material, having been severed by cutter 32 during the preceding movement of the turret's one-eighth revolution, is shown advanced into the loading position and wrapped about the sides and bottom end of the folded napkin 36.

As is evident, step by step sequential cutting results in individual panels which extend from the center of one hardened insert 35 to the center of the next insert spaced therefrom in the direction of turret rotation. Thus, prior to the projection of article 36 into chamber 16, as shown, the edges 40 and 42 of panel 38 were caused to move along turret surface 30 from the dotted line positions 40a and 42a respectively to their heavy line positions 40 and 42 respectively.

During the step by step movement of turret 10 from a position adjacent applicator roll 28, past cutter 32, and into the loading position, the sheet stock is held snugly against the drum-like turret by vacuum applied thereto by several sets of outwardly open passages such as bores 44. For example, four such spaced bores 44 may be employed, as shown in FIGS. 3 and 4. Bores 44 are interconnected by axially extending passages 46 with those passage being suitably connected, one to the other, and to a suitable source of vacuum, not shown, to place all of such bores 44 as are positioned at one time between applicator roll 28 and loading station under negative pressure.

As shown in FIG. 2, a fixed manifold member 48 is maintained in fluid-sealing engagement against an inner wall bearing surface of turret 10, and extends circumferentially as shown dotted in FIG. 1, from somewhat below the position of application of material 26 to a position below a reciprocal tucker 50, later described. Member 48 is provided with two circumferentially extending manifold passageways 52 and 53. Passageway 52 extends from a position adjacent applicator roll 28 to terminate in registry with that axially extending passageway 46 shown at the right of the loading station. A fixture 54 connects a vacuum source, not shown, to chamber 52. Such axially extending passages 46 as are positioned by the step-by-step turret movement between applicator roll 28 and the article loading station are thus connected to manifold 52 to apply a vacuum to radially extending bores 44 leading therefrom and provided in closely spaced parallel relation along opposite walls of chambers 16.

The vacuum thus applied maintains the wrapper material 26, and especially those portions thereof which bridge chambers 16 in snug engagement with the turret surface marginally of the article chambers. An additional set of like vacuum bores is provided closely adjacent the trail-ends of hardened inserts 35 to insure that as wrapper material 266 is severed into panels by cutter blade 34 the leading end of the uncut material 26 is maintained snug against the insert. Since the trailing ends of the cut panels tend to hug the turret, a corresponding set of vacuum bores are normally not required near the leading ends of inserts 35, especially if the inserts are spaced, as shown, closer to a leading than to a trailing chamber 16. Each cut panel 38 is thus snugly held against the turret surface marginally of the article chambers with each panel 38 extending between the centers of inserts 35 on opposite sides of the loading station, as shown dotted in FIG. 1, the cut margins thereof prior to loading being positioned at 40a and 42a respectively.

As turret 10 comes to rest upon completion of each indexed movement, rods 24 are drawn downwardly by a suitable known mechanism, not shown, and synchronized with the turret movement, to cause loading finger 20 to pass downwardly through the loading turret chamber 18 then in registry with an article receiving chamber 16 of packaging turret 10 over which a cut panel 38 is maintained snugly bridged. As finger 20 thus forces article 36 to be wrapped from the loading turret 19 downwardly through a guide 29 and into chamber 16, a major portion of panel 38 is drawn by the article into the chamber against resistive forces later described. Simultaneously with the transfer of article 36 from loading turret 19 to packaging turret 10 an ejector bar 33, fixed to rods 24 above a diametrically opposite chamber 16 in turret 10 moves down a like distance and through the latter chamber to eject a processed article 36a about which a cut panel has been wrapped and sealed in the manner taught herein. Since the apparatus associated with turret 10 effects a complete wrap and sealing of the wrapper material about the bottom, top and side walls of article 36 but does not effect end sealing of the wrapper material, the processed article 36a may be ejected into a chamber 62 of a turret or other transfer mechanism 64 for conveyance to means not forming a part of this invention for the required end sealing of the wrapper material. Upon completion of the simultaneous loading of an article to be wrapped and the ejection of a wrapped article, rods 24, hence loading finger 20 and ejector bar 33 fixed thereto are returned to the elevated positions shown in FIGS. 1 and 2 preparatory to the next indexed operation.

As article 36 moves into chamber 16 as above described, the bottom wall thereof contacts the chamber bridging portion of panel 38 to draw the bridged portion into chamber 16 as the portion of panel 38 laterally thereof moves inwardly and over the arcuate portions 58 of the circumferentially spaced chamber walls to engage opposite sides of article 36. During the resulting wrap of the sheet material 26, which may be a sheet of plastic having inherent stretch, the material is maintained taut by the substantial frictional resistance to which the material is subjected as the outer panel portions continue to be snugly held against the turret surface by the two adjacent rows of vacuum bores 44. As the loading operation continues and article 36 is fully deposited in chamber 16, the ends of panel 38 have moved from the dotted to full line positions shown, but the non-wrapped portions are still maintained snugly against the turret surfaces marginally of the chamber since they have not been drawn inwardly a sufficient extent to uncover the vacuum bores. While the leading edge of panel 38 is moving from its dotted position 42a to its full line position 42 across that row of vacuum bores immediately trailing the forward insert 35, no vacuum is applied to those bores since the axial chamber 46 associated therewith has moved beyond the vacuum manifold passageway 52.

Article 36 was thus forced into chamber 16 against the continuously maintained resistance of panel 38 imposed by reason of its snug engagement with the turret surfaces as it passes over the arced edges of chamber 16. The wrapper material is thus applied under substantial inherent tension to the bottom and side wall surfaces of article 36 to insure such application in the absence of wrinkles or unevenly stressed areas. The loading and initial wrapping operation thus being completed, the turret is then indexed forwardly to a tucker station, with the cutting and wrapping operation above described simultaneously repeated in respect to the immediately trailing panel.

Article 36 thus partially wrapped moves clockwise during the next indexing step to come to rest in the position shown under a reciprocable tucker 50 as the vacuum bores marginally of chambers 16 move into registry with manifold passageway 53 which has a source of positive pressure, not shown, connected thereto through a fixture 60. During that indexing step the set of bores adjacent the leading insert 35 passes completely through passageway 53 and while subjected to positive pressure during such movement the resulting positive pressure serves no function. However, as the axial chamber 46 of the immediately trailing set of bores moves beyond the negative pressure passageway 52 the vacuum is relieved and upon movement into registry with passageway 53 the resulting positive pressure blows the leading unwrapped portion of panel 38 into a radial position as shown at the tucker station. The corresponding re-positioning of axial chamber 46 which trails chamber 16 from a vacuum applying manifold passageway results in a like radial positioning of the unwrapped trailing portion of the panel. Both panel portions are maintained in that position by the pressurized air continuously issuing from the rows of marginal bores which continues during the period of rest of the partially wrapped article 36 at the tucker station.

Tucker arm 50 is synchronized in a known manner in respect to turret indexing to move downwardly upon completion of each indexing cycle from a position of retraction, not shown, to the position of folding engagement with the trailing marginal portion of panel 38 to wrap that portion against the top wall of article 36, as shown. Reciprocable tucker arm 50 is of course sufficiently retracted from the tucking position shown during each indexing operation to allow both of the up-blown margins of the panel to pass thereunder. Such tucker mechanism is well known and may be cam or otherwise actuated. The trailing marginal portion of panel 38 is subjected to sufficient pressure when tucked to insure a wrapped placement thereof during the next indexing step.

Upon completion of tucking as shown in FIG. 1 and subsequent retraction of the tucker arm to an elevated position, turret 10, during its next indexing step, moves the article 36 from the tucker station and under a continuously moving heat resistant belt 66 of Teflon or the like to effect over-folding in a known manner of the leading marginal portion of panel 38 shown radially positioned at the tucker station. Thereafter the tucked and over-folded material is heat sealed while maintained in pressure engagement with belt 66 which is backed by heated element 68. Element 68 is pivotally mounted on a shaft 70 and biased in a clockwise direction by a means not shown for pressure engagement with belt 66. Sufficient heat is applied by element 68 to flow through belt 66 to the over-folded wrapper material and effect a thermoplastic bond. During the next indexing step the overlapped wrapper material thus bonded and while held pressurized by belt 66 moves past a cooling element 72 to fix the bond prior to the pressure release of belt 66 as the turret path diverges from the belt path during movement to its next indexed position and eventually to the ejector station diametrically below the loading station as above mentioned.

As will be recognized by persons familiar with the art, many of the constructional features of such a turret are well known as is all of the mechanism associated therewith to effect synchronized operation of apparatus located at the various work stations. Various adaptations and modifications of the concepts herein taught will readily suggest themselves in respect to packaging turrets of various types.

I claim:

1. A method of enclosing folded sanitary napkins or the like within plastic sheet stock having inherent stretch, said method consisting of the steps of applying the sheet stock to the circumferential surface of an indexable turret provided with outwardly open circumferentially spaced and radially extending pockets of rectangular cross sectional configuration, said sheet stock being applied sequentially to bridge said pockets, applying vacuum to the under side of said stock in areas extending transversely of the turret immediately adjacent opposed circumferentially spaced pocket walls, severing the stock transversely of the turret along lines positioned intermediate the pockets thereof to provide individual article enclosing panels each of which bridges a pocket and extends circumferentially on either side thereof a distance greater than the pocket depth with panel portions adjacent the pockets maintained by the applied vacuum snugly against peripheral areas of the turret, sequentially indexing the panel bridged pockets into a loading station, projecting a folded and compressed sanitary napkin or the like of rectangular cross sectional configuration into the panel bridged pocket at the loading station while drawing the panel therewith against substantial frictional resistance imparted by drawing the sheet stock portion outwardly of the pocket over the turret surface portion adjacent the pocket while the stock is snugly maintained thereagainst by the applied vacuum, and the article enclosing portion of the stock is maintained stretched as the result of article projection into the turret against said frictional resistance, further indexing the turret toward a tucker station while removing vacuum and applying air pressure to the stock adjacent the pocket during pocket movement from the loading to the tucker station to raise the stock portions previously held snugly against the turret to positions radially thereof, tucking the trailing radially positioned portion against the outer surface of the pocketed article, downfolding the radially extending leading stock portion against the tucked trailing portion, and thereafter subjecting the resultant overlapped stock portions to heat to effect interbonding thereof.

2. A method of enclosing folded sanitary napkins or the like within plastic sheet stock having inherent stretch, said method consisting of the steps of applying the sheet stock to the circumferential surface of an indexable turret provided with outwardly open circumferentially spaced and radially extending pockets of rectangular cross sectional configuration, said sheet stock being applied sequentially to bridge said pockets, applying vacuum to the under side of said stock in areas extending transversely of the turret immediately adjacent opposed circumferentially spaced pocket walls, severing the stock transversely of the turret along lines positioned intermediate the pockets thereof to provide individual article enclosing panels each of which bridges a pocket and extends circumferentially on either side thereof a distance greater than the pocket depth with panel portions adjacent the pockets maintained by the applied vacuum snugly against peripheral areas of the turret, sequentially indexing the panel bridged pockets into a loading station, projecting a folded and compressed sanitary napkin or the like of rectangular cross sectional configuration into the panel bridged pocket at the loading station while drawing the panel therewith against substantial friction resistance imparted by drawing the sheet stock portion outwardly of the pocket over the turret surface portion adjacent the pocket and through a path defining an angle downwardly of a pocket wall while the stock is snugly maintained against the peripheral turret surface by the applied vacuum and against the pocket wall by the expansive forces of the article while subjecting the stock to stress as it encloses the article in U-configuration, and further indexing the turret while applying positive air pressure in place of vacuum as the pocket moves outwardly of the loading station to blow non-wrapped end portions of the panel radially outwardly of the turret, whereby to facilitate subsequent tucking, overlapping and sealing thereof.

References Cited in the file of this patent
UNITED STATES PATENTS

| | | |
|---|---|---|
| 2,387,747 | Bowley | Oct. 30, 1945 |
| 2,952,105 | Schur | Sept. 13, 1960 |

UNITED STATES PATENT OFFICE
CERTIFICATE OF CORRECTION

Patent No. 3,035,379                          May 22, 1962

Henry R. Cloots

It is hereby certified that error appears in the above numbered patent requiring correction and that the said Letters Patent should read as corrected below.

Column 2, line 53, for "trail-" read -- trailing --; line 55, for "266" read -- 26 --; column 4, line 8, before "manifold" insert -- to a positive pressure applying --.

Signed and sealed this 10th day of September 1963.

(SEAL)
Attest:

ERNEST W. SWIDER
Attesting Officer

DAVID L. LADD
Commissioner of Patents